(12) United States Patent
Weigand et al.

(10) Patent No.: US 8,371,608 B2
(45) Date of Patent: Feb. 12, 2013

(54) AIRBAG ARRANGEMENT FOR A VEHICLE OCCUPANT RESTRAINT SYSTEM AND METHOD FOR PRODUCING AN AIRBAG ARRANGEMENT

(75) Inventors: Steffen Weigand, Aschaffenburg (DE); Thomas Hofmann, Aschaffenburg (DE)

(73) Assignee: Takata AG, Aschaffenburg (DE)

( * ) Notice: Subject to any disclaimer, the term of this patent is extended or adjusted under 35 U.S.C. 154(b) by 0 days.

(21) Appl. No.: 13/317,250

(22) Filed: Oct. 13, 2011

(65) Prior Publication Data

US 2012/0032424 A1    Feb. 9, 2012

Related U.S. Application Data

(63) Continuation of application No. PCT/EP2010/054962, filed on Apr. 15, 2010.

(30) Foreign Application Priority Data

Apr. 16, 2009  (DE) .......................... 10 2009 017 920

(51) Int. Cl.
*B60R 21/20* (2011.01)
(52) U.S. Cl. .................................... 280/728.2
(58) Field of Classification Search ............... 280/728.2, 280/731, 732
See application file for complete search history.

(56) References Cited

U.S. PATENT DOCUMENTS

| | | | |
|---|---|---|---|
| 5,096,222 A | 3/1992 | Komerska et al. | |
| 5,421,607 A * | 6/1995 | Gordon | 280/728.2 |
| 5,454,588 A | 10/1995 | Rose | |
| 5,605,347 A | 2/1997 | Karlow et al. | |
| 5,658,008 A * | 8/1997 | Herrmann et al. | 280/728.2 |
| 5,765,867 A | 6/1998 | French | |
| 5,791,682 A * | 8/1998 | Hiramitsu et al. | 280/728.2 |
| 6,209,906 B1 * | 4/2001 | DeWitt | 280/728.3 |
| 7,866,688 B2 * | 1/2011 | Basten | 280/729 |
| 7,900,954 B2 * | 3/2011 | Sahm | 280/728.2 |
| 2002/0135160 A1 | 9/2002 | Lorenz | |
| 2003/0209888 A1 | 11/2003 | Davis et al. | |
| 2005/0230938 A1 * | 10/2005 | Thomas et al. | 280/728.2 |
| 2007/0108752 A1 * | 5/2007 | Eckert et al. | 280/743.1 |
| 2007/0138768 A1 | 6/2007 | Miwa et al. | |
| 2007/0138769 A1 | 6/2007 | Miwa et al. | |

(Continued)

FOREIGN PATENT DOCUMENTS

DE       101 14 208 A1      5/2002
DE   20 2005 011 878 U1   11/2005

(Continued)

OTHER PUBLICATIONS

Spaced: Definition, MacMillian Dictionary, available at, http://www.macmillandictionary.com/dictionary/american/spaced (last visited May 17, 2012).*

(Continued)

*Primary Examiner* — Joseph Rocca
(74) *Attorney, Agent, or Firm* — Foley & Lardner LLP

(57) ABSTRACT

An air bag arrangement for a vehicle occupant restraint system is provided. The air bag arrangement comprising an air bag package, having an air bag, which can be inflated to protect a vehicle occupant, and an envelope, in which the air bag is vacuum-packed, a gas generator for inflating the air bag, a gas generator support, on which the gas generator is fixed and a mounting element, fastened to the gas generator support, to house the air bag package. The mounting element has fastening means via which it is connected to the air bag package in a positive-locking manner and has multiple partial elements.

15 Claims, 4 Drawing Sheets

U.S. PATENT DOCUMENTS

| | | |
|---|---|---|
| 2007/0145724 A1 | 6/2007 | Miwa et al. |
| 2007/0267850 A1* | 11/2007 | Eckert et al. ............... 280/728.2 |
| 2008/0111351 A1 | 5/2008 | Eckert et al. |
| 2009/0014987 A1* | 1/2009 | Weigand et al. ........... 280/728.3 |
| 2009/0194977 A1 | 8/2009 | Sahm |
| 2010/0038888 A1 | 2/2010 | Hamels |

FOREIGN PATENT DOCUMENTS

| | | |
|---|---|---|
| DE | 10 2006 013 990 A1 | 9/2007 |
| DE | 20 2007 007 885 U1 | 10/2007 |
| DE | 10 2006 034 740 A1 | 1/2008 |
| DE | 10 2007 001 476 A1 | 7/2008 |
| EP | 1 481 855 A1 | 12/2001 |
| WO | WO-2006/050719 A1 | 5/2006 |
| WO | WO-2008/130286 A1 | 10/2008 |

OTHER PUBLICATIONS

Apart: Definition, MacMillian Dictionary, available at, http://www.macmillandictionary.com/dictionary/american/apart (last visited May 17, 2012).*

International Search Report for PCT/EP2010/054962; Sep. 14, 2010; 6 pages.

Office Action in U.S. Appl. No. 13/244,081 dated Feb. 27, 2012.

\* cited by examiner

AIRBAG ARRANGEMENT FOR A VEHICLE OCCUPANT RESTRAINT SYSTEM AND METHOD FOR PRODUCING AN AIRBAG ARRANGEMENT

CROSS-REFERENCE TO A RELATED APPLICATION

This application is a continuation of International Patent Application Number PCT/EP 2010/054962, filed on Apr. 15, 2010, which was published in German as WO 2010/119096. The foregoing international application is incorporated by reference herein.

BACKGROUND

The invention relates to an air bag arrangement for a vehicle occupant restraint system as well as to a method for producing such an air bag arrangement.

Air bag arrangements with an air bag package having a vacuum-packed air bag in a coating are known from prior art. The air bag package, along with a gas generator for inflating the air bag, is fixed onto a gas generator support, particularly by a locking engagement of fastening structures of the gas generator support with the air bag package.

SUMMARY

The problem to be solved by the present invention consists in developing an air bag arrangement, which can be produced as simply as possible, having an air bag package, and a method for producing such an air bag arrangement.

According to an exemplary embodiment of the invention an air bag arrangement for a vehicle occupant restraint system is provided, comprising an air bag package, having an air bag, which can be inflated to protect a vehicle occupant, as well as an envelope, in which the air bag is vacuum-packed;
  a gas generator for inflating the air bag;
  a gas generator support, on which the gas generator is arranged;
  a mounting element, fastened to the gas generator support, to house the air bag package, wherein the mounting element has fastening means via which it is connected to the air bag package in a positive-locking manner.

Such an air bag arrangement can, for instance, be integrated into the steering wheel of the vehicle as part of a protection device or it can also be arranged on the passenger's side of the vehicle.

The positive-locking connection between the mounting element and the air bag package is, in particular, established by the fact that the fastening means of the mounting element comprise a fastening structure, which engages in a recess in the air bag package. The recess is particularly created by denting the air bag and the envelope surrounding the air bag, i.e. the recess does not represent an opening in the envelope or in the air bag, through which gas could escape from the air bag package outwards.

According to one exemplary embodiment the air bag package is essentially shaped cylindrical, i.e. it has two, particularly circular, front sides, lying opposite each other, between which a shell surface extends. In one embodiment of this variant, the recess, into which the fastening structure of the mounting element extends, is formed in the shell surface, for example in the shape of a circumferential groove.

Obviously, however, the recess does not have to be formed in the shape of a circumferential groove, but instead it is also possible that an individual, locally confined (i.e. non-circumferential) recess or multiple recesses, spaced apart from each other, is/are formed in the side of the air bag package, that is pointing outwards, i.e. towards the mounting element. For instance, the individual recess or the multiple recesses is/are located in the area of a lower end of the air bag package, i.e. facing the gas generator.

The fastening structure of the mounting element is e.g. formed in the shape of a locking element, particularly elastic, which is locked in place in the recess of the air bag package. Such a locking element can be formed in one piece with the mounting element and for example be shaped as a solid protrusion, protruding inwards from the remaining mounting element, i.e. facing the air bag package.

However, it is also conceivable that the fastening structure is bent latch-like from an area of the mounting element towards the air bag package and engages, with one end of the latch, with the recess of the air bag package. Furthermore, various kinds of fastening structures can also be formed on the mounting element in combination, for example solid protrusions or hooks and one or multiple fastening latches.

In a further exemplary embodiment of the invention the gas generator support is made of a plastic or has a plastic. In this variant, a stable connection, which can easily be established, between the gas generator support and the air bag package is realized via the mounting element, for example without the gas generator support itself having to have fastening structures for fastening to the air bag package. In particular, it is not necessary to provide separate plastic elements, which are pivoted into a recess of the air bag package, to connect the gas generator support to the air bag package.

The mounting element is particularly made of a metal, wherein the fastening means have, particularly, fastening structures in the form of fastening latches, formed from the mounting element by creating free punches. However, other materials or combinations of material are also suitable, e.g. plastic materials.

According to a further exemplary variant of the invention the mounting element has fastening means via which it is fixed onto the gas generator support. In particular, these fastening means, analogous to the fastening means which serve for fixing the mounting element onto the air bag package, allow a positive-locking connection between the mounting element and the gas generator support.

For instance, these fastening means comprise at least one locking element, which engages in a notch of the gas generator support. Alternatively or additionally, these fastening means can comprise at least one fastening bolt, which reaches through an opening in the gas generator support and which, for example, is fixed with a nut onto the gas generator support on that side of the gas generator support, which is turned away from the air bag package. The fastening bolt can, for example, be connected to the mounting element or be formed in one piece with the mounting element. Moreover, the fastening bolt can reach through a structure, which is formed on the gas generator or connected to it, and consequently simultaneously serve for fastening the gas generator onto the gas generator support.

Furthermore, it is also conceivable that the gas generator has a fastening bolt or is connected to a fastening bolt, which reaches through an opening in the mounting element and an opening in the gas generator support to fix the gas generator and the mounting element onto the gas generator support.

In a further exemplary embodiment of the invention the mounting element is formed hollow cylindrical or ring-shaped, wherein e.g. in one end of the mounting element an opening is provided for inserting the air bag package upon mounting the air bag arrangement and in the end opposite said end of the mounting element an opening is provided in which the gas generator is arranged. The opening for inserting the air bag package is particularly realized in that this end of the mounting element is completely open, i.e. the opening possesses a diameter, which corresponds to the inside diameter of the mounting element and consequently has no edge structure protruding inwards from the shell surface.

The end of the mounting element, lying opposite to this end, is, however, particularly furnished with an opening, which has a smaller diameter in comparison with the inside diameter of the mounting element and consequently is confined by a ring-shaped edge protruding inwards from the shell surface. In this edge openings are provided for example for the passing through of one or multiple fastening bolts for fixing the gas generator and/or the mounting element onto the gas generator support.

It is also possible that the mounting element has multiple partial elements, which e.g. are arranged spaced apart from each other. For instance, the mounting element has two partial elements (particularly in the shape of half shells), which are arranged laterally on the air bag package (e.g. in an air bag package constructed cylindrical).

In another exemplary embodiment of the invention the gas generator support has at least one opening, through which the engagement of the locking element can be visually and/or mechanically verified. This opening is particularly a passage opening in the gas generator support, located in the area of the recess of the air bag package.

To house the gas generator, the air bag package can have an additional recess, i.e. an inward indentation, into which the gas generator projects with a section. In particular, this recess is formed, in an air bag package that is shaped cylindrical, on one of the ends (front sides) of the air bag package. The gas generator is e.g. formed in the shape of a canister-type gas generator, i.e. it has an essentially circular cylindrical cross section, wherein the recess, formed in the air bag package to house said gas generator, is correspondingly shaped as circular cylindrical hollow space.

In another exemplary embodiment of the invention a section of the envelope surrounding the air bag is folded and arranged between the remaining bag package and the mounting element. In particular, this section is a protrusion of the envelope, which originally protruded e.g. upwards, i.e. from a side of the air bag package which was turned away from the gas generator, or to the side of the remaining air bag package, wherein by folding and arranging this section between the air bag package and the mounting element an impediment to the production of the air bag arrangement or to the unfolding of the air bag is avoided.

Furthermore, the invention relates to a method for producing an air bag arrangement with the steps:
  Providing an air bag package as well as a mounting element, having fastening means to establish a positive-locking connection to the air bag package;
  Inserting the air bag package into the mounting element until a positive-locking connection between air bag package and mounting element is established; and
  Fastening the mounting element onto a gas generator support.

BRIEF DESCRIPTION OF THE DRAWINGS

The invention will subsequently be further explained referring to the figures with the help of exemplary embodiments.

DETAILED DESCRIPTION

Figure 1:
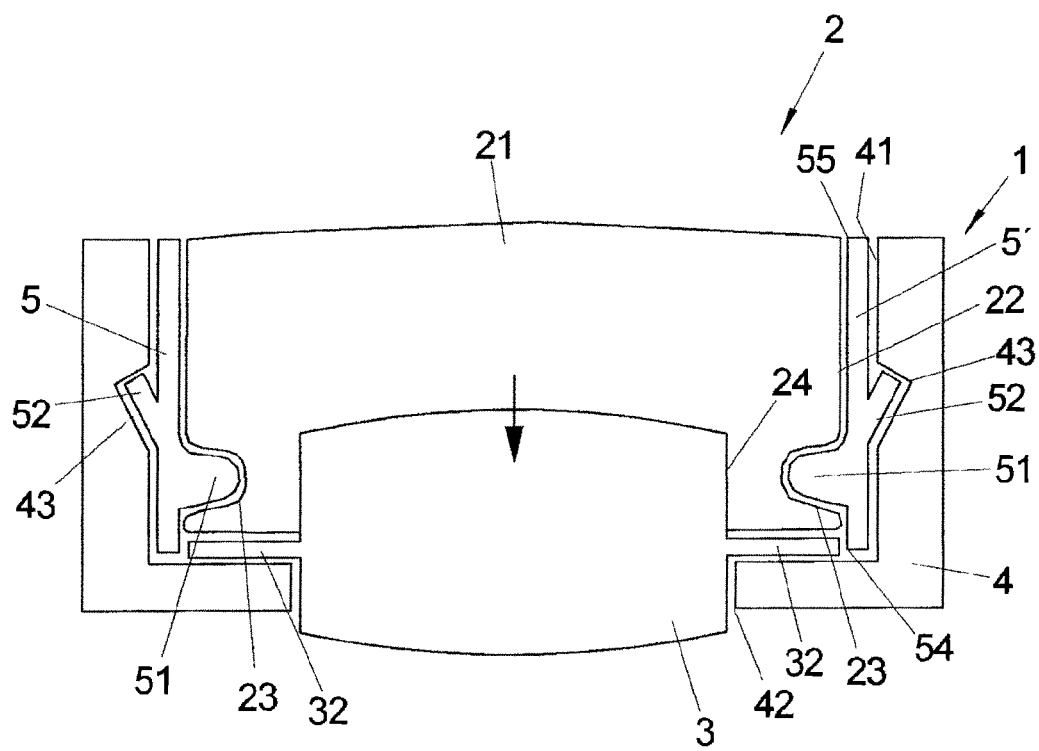
FIG. 1 shows a sectional view of an air bag arrangement according to a first exemplary embodiment of the invention.

The air bag arrangement 1 illustrated in FIG. 1 comprises an air bag package 2 consisting of an air bag 21, which is surrounded by an envelope, formed as foil 22, and which is vacuum-packed in said envelope. Furthermore, the air bag arrangement 1 comprises a gas generator in the form of a canister-type gas generator 3, which is fixed onto a gas generator support 4. The air bag package 2 is fastened to the gas generator support 4 via a mounting element 5.

The mounting element 5 has fastening means in the form of locking catches 51, which engage in a groove 23 of the air bag package 2 and connect the air bag package to the mounting element in a positive-locking manner.

In the illustrated exemplary embodiment the air bag package is approximatively shaped cylindrical, wherein the groove 23 runs circumferentially in the shell surface of the air bag package. The mounting element 5 is configured ring-like and extends with one side wall between the gas generator support 4 and the air bag package 2. The locking catches 51 can likewise be formed as circumferential structure; it is, however, also particularly possible that only one or multiple locking catches, spaced apart from each other, is/are present. It is also possible that the mounting element has multiple partial elements, which e.g. are arranged spaces apart from each other. For instance, the mounting element has two partial elements 5 and 5' (as seen in FIG. 1), which are arranged laterally on the air bag package (e.g. in a cylindrical air bag package).

Apart from the locking catches 51, the mounting element 5 has locking arms 52, which are locked in place in notches 43 of the side wall of the gas generator support 4, whereby a positive-locking connection of the gas generator support to the mounting element is realized. In contrast to the locking catches 51, the locking elements 52 protrude outwards from the side wall of the mounting element 5, i.e. they are pointing away from the air bag package 2.

Furthermore, the mounting element 5 has in each of its ends an opening 54, 55, wherein trough the opening 55, which is turned away from the gas generator, e.g. the air bag package 2 can be inserted into the mounting element for mounting the air bag arrangement and through the opposite opening 54 the gas generator projects into the mounting element.

The gas generator support 4, likewise essentially shaped hollow cylindrical, has in one of its ends an opening 41, through which the air bag package, previously fixed onto the mounting element, is inserted into the gas generator support. Furthermore, the gas generator support 4 has in the end which lies opposite the opening 41 an opening 42, in which the gas generator 3 is arranged. The gas generator 3 extends through the opening 42 of the gas generator support and the opening 54 of the mounting element into a recess 24 of the air bag package. Moreover, the gas generator 3 has two extension arms 32 lying opposite each other, which bear against an edge of the gas generator support, which surrounds the opening 42, or which are fixed onto this edge.

Figure 1A:
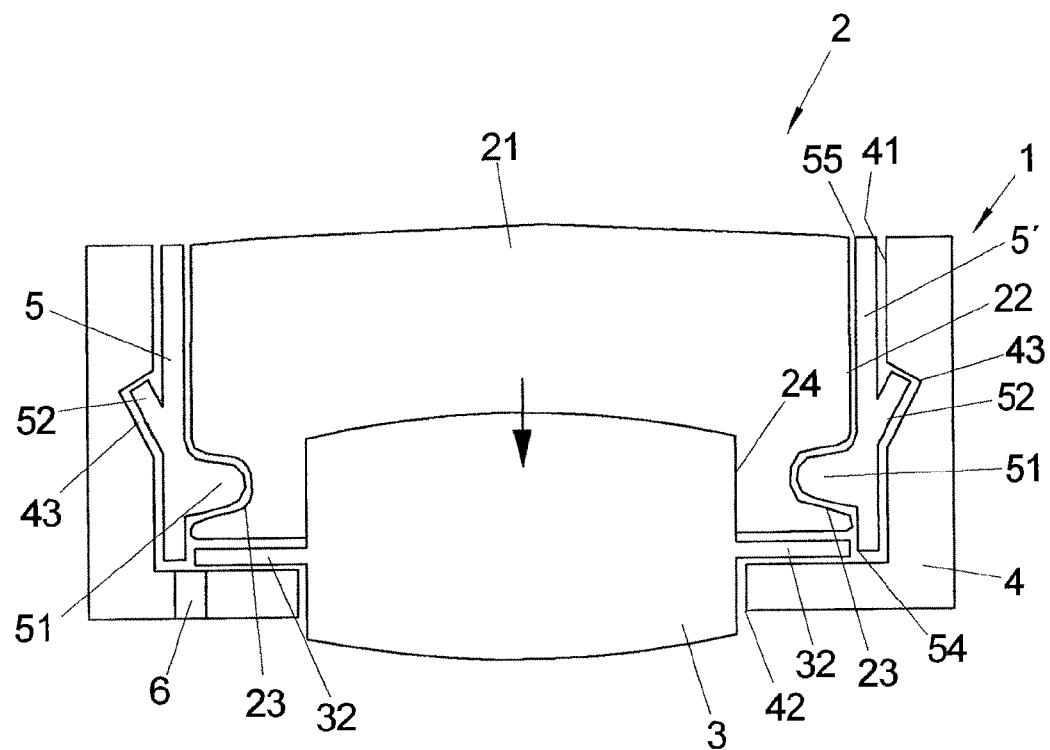
FIG. 1A shows a schematic sectional view of an air bag arrangement according to another exemplary embodiment of the invention.

A modification of the exemplary embodiment of FIG. 1 is shown in FIG. 1A. In this case, the gas generator support 4 has at least one opening 6, through which the engagement of the locking element 52 can be visually and/or mechanically verified. This opening 6 is particularly a passage opening in the gas generator support 4, located in the area of the recess 24 of the air bag package 2.

Figure 2:
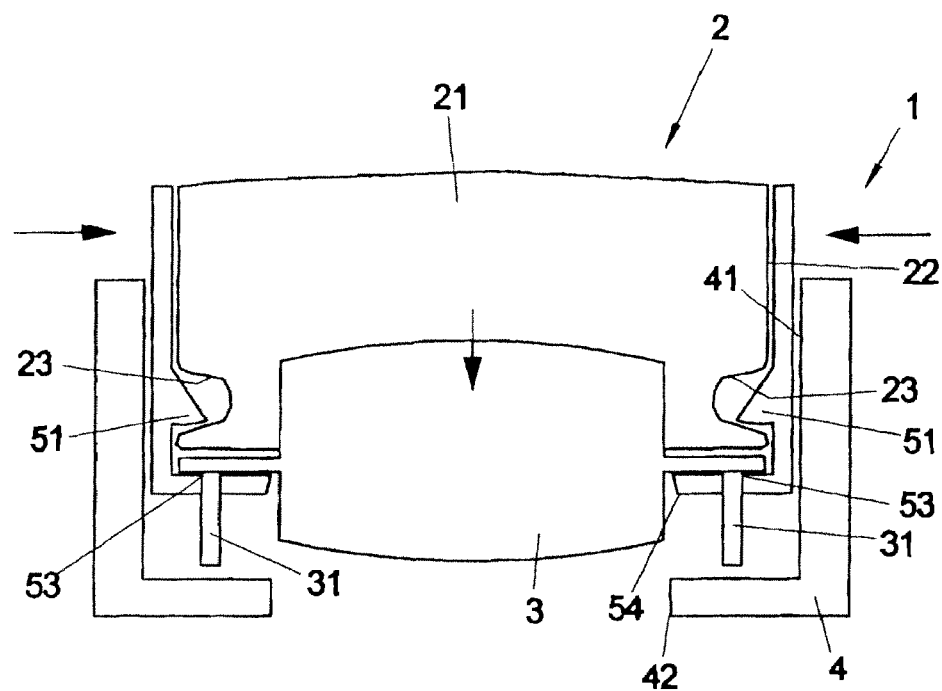
FIG. 2 shows a sectional view of an air bag arrangement according to a second exemplary embodiment of the invention.

A modification of the exemplary embodiment of FIG. 1 is shown in FIG. 2. In this case, the connection of the mounting element 5 does not take place via locking elements, but instead via fastening bolts 31, formed on the gas generator, which said fastening bolts 31 reach through the openings 53 in the mounting element 5. Furthermore, openings are likewise provided in the gas generator support 4, which the fastening bolts 31 reach through and which are, particularly with a nut (not illustrated), fixed onto the gas generator support 4, on the side turned away from the air bag package 2.

The openings 53 for passing through the fastening bolt 31 are arranged on an edge of the mounting element, which surrounds the opening 54, through which the gas generator extends. The gas generator support 4 analogously has an edge around the opening 42, in which openings for passing through the fastening bolts 31 are arranged, which, in the completely mounted state of the air bag arrangement, align with the openings 53 of the mounting element. FIG. 2 shows the air bag arrangement prior to mounting the fastening bolt onto the gas generator support.

Furthermore, according to the exemplary embodiment of FIG. 2 the locking catches 51 are not shaped like a bulge as in FIG. 1, but instead they form a side that is pointing downwards so that an acute-angled locking structure is produced. The invention is obviously not defined by one of these two kinds of locking structures, but instead basically any structures can be used which allow for a locking engagement between mounting element and air bag package.

Figure 3:
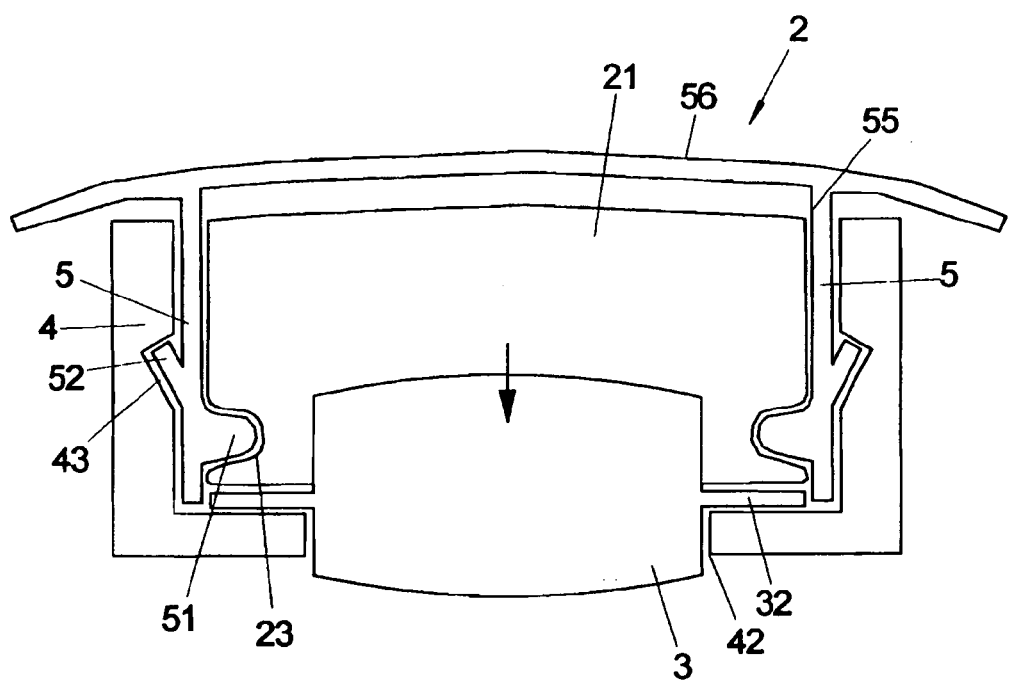
FIG. 3 shows a sectional view of an air bag arrangement according to a third exemplary embodiment of the invention.

FIG. 3 shows a modification of the exemplary embodiment of FIG. 1. The mounting element 5 is connected to an air bag cap 56 (particularly formed in one piece with said mounting element 5), which spans the opening 55 and consequently the air bag package 2 on a side, which is turned away from the gas generator 3. With the air bag arrangement arranged in the vehicle, the air bag cap consequently forms a side of the air bag arrangement, pointing to the vehicle interior, wherein the air bag cap has e.g. a weakening, which yields (particularly tears open) under the deployment pressure of the air bag, so that the air bag can unfold into the vehicle interior.

Moreover, the air bag cap 56 extends laterally beyond the opening 55 (i.e. beyond the mounting element 5), such that, with a section of the edge, it additionally covers the side of the gas generator support 4, which is turned away from the gas generator.

It is pointed out that elements of the exemplary embodiments of FIGS. 1 to 3 can, of course, also be used in combination with each other; e.g. the mounting element can be connected to the gas generator support via fastening bolts and, additionally, also via a locking structure, which is formed on the mounting element.

The priority application, German Patent Application Number 10 2009 017 920.8, filed Apr. 16, 2009 is incorporated by reference herein.

The invention claimed is:

1. An air bag arrangement for a vehicle occupant restraint system, comprising:
   an air bag package, having an airbag, which can be inflated to protect a vehicle occupant, as well as an envelope, in which the air bag is vacuum-packed;
   a gas generator for inflating the air bag;
   a gas generator support, on which the gas generator is arranged; and
   a mounting element, fastened to the gas generator support, to house the air bag package,
   wherein the mounting element has at least one fastening structure via which the mounting element is connected to the air bag package in a positive-locking manner,
   wherein the mounting element has two partial elements arranged laterally on the airbag package in such a way that the two partial elements form a hollow-cylindrical or ring-shaped structure and provide a first opening in one end of the mounting element for inserting the airbag package upon mounting the airbag arrangement and a second opening in the opposite end of the mounting element in which the gas generator is arranged,
   wherein the at least one fastening structure engages with a recess of the airbag package,
   wherein the at least one fastening structure is located on an inner side of the mounting element,
   wherein the mounting element has fastening means via which the mounting element is fixed onto the gas generator support, and
   wherein the fastening means comprise at least one locking element which is locked in place in a notch of the gas generator support.

2. The air bag arrangement according to claim 1, wherein the air bag package is essentially shaped cylindrically with a shell surface and the recess is formed in the shell surface.

3. The air bag arrangement according to claim 1, wherein the recess of the air bag package is formed as circumferential groove.

4. The air bag arrangement according to claim 1, wherein the fastening structure is formed in a shape of locking element, which is locked in place in the recess of the air bag package.

5. The air bag arrangement according to claim 4, wherein the gas generator support has at least one opening, via which an engagement of the locking element can be visually verified, mechanically verified, or a combination thereof.

6. The air bag arrangement according to claim 1, wherein the gas generator support is made of plastic.

7. The air bag arrangement according to claim 1, wherein the air bag package has a second recess, in which at least a section of the gas generator is arranged.

8. The air bag arrangement according to claim 1, wherein the gas generator is formed as a canister-type gas generator.

9. The air bag arrangement according to claim 1, wherein a section of the envelope surrounding the air bag is folded and arranged between the remaining air bag package and the mounting element.

10. The air bag arrangement according to claim 1, wherein the mounting element is connected to a cover, covering the air bag package on a side turned away from the gas generator.

11. A vehicle with an air bag arrangement according to claim 1.

12. An air bag arrangement for a vehicle occupant restraint system, comprising;
    an air bag package, having an airbag, which can be inflated to protect a vehicle occupant, as well as an envelope, in which the air bag is vacuum-packed;
    a gas generator for inflating the air bag;
    a gas generator support, on which the gas generator is arranged; and
    a mounting element, fastened to the gas generator support, to house the air bag package,
    wherein the mounting element has at least one fastening structure via which the mounting element is connected to the air bag package in a positive-locking manner, wherein the mounting element has two partial elements arranged laterally on the airbag package in such a way that the two partial elements form a hollow-cylindrical or ring-shaped structure and provide a first opening in one end of the mounting element for inserting the airbag package upon mounting the airbag arrangement and a second opening in the opposite end of the mounting element in which the gas generator is arranged, wherein the a least one fastening structure engages with a recess of the air bag package, wherein the at least one fastening structure on an inner side of the mounting element, wherein the mounting element has fastening means via which the mounting element is fixed onto the gas generator support, and wherein the fastening means comprise at least one fastening bolt which reaches through an opening in the gas generator support.

13. The air bag arrangement according to claim 12, wherein a third opening, through which the fastening bolt reaches, is formed in the opposite end of the mounting element.

14. An airbag arrangement for a vehicle occupant restraint system, comprising:

an air bag package, having an air bag, which can be inflated to protect a vehicle occupant, as well as an envelope, in which the air bag is vacuum-packed;

a gas generator for inflating the air bag;

a gas generator support, on which the gas generator is arranged; and a mounting element, fastened to the gas generator support, to house the air bag package, wherein the mounting element has at least one fastening structure via which the mounting element is connected to the air bag package in a positive-locking manner, wherein the mounting element has two partial elements arranged laterally on the airbag package in such a way that the two partial elements form a hollow-cylindrical or ring-shaped structure and provide a first opening in one end of the mounting element for inserting the airbag package upon mounting the airbag arrangement and a second opening in the opposite end of the mounting element in which the gas generator is arranged, wherein the at least one fastening structure engages with a recess of the air bag package, wherein the at least one fastening structure is located on an inner side of the mounting element, and wherein the gas generator has at least one fastening bolt which reaches through a third opening in the mounting element and an opening in the gas generator support.

15. A method for producing an air bag arrangement, comprising:

providing an air bag package as well as a mounting element, the mounting element having at least one fastening structure to establish a positive-locking connection to the air bag package, the mounting element having two partial elements arranged laterally on the airbag package in such a way that the two partial elements form a hollow-cylindrical or ring-shaped structure and provide a first opening in one end of the mounting element for inserting the airbag package upon mounting the airbag arrangement and a second opening in the opposite end of them mounting element in which the gas generator is arranged, wherein the at least one fastening structure engages with a recess of the air bag package, wherein the at least one fastening structure is located on an inner side of the mounting element;

inserting the air bag package into the mounting element through the first opening until the positive-locking connection between the air bag package and the mounting element is established; and fastening the mounting element to a gas generator support, wherein the mounting element has fastening means via which the mounting element is fixed onto the gas generator support, and wherein the fastening means comprises at least one locking element which is locked in place in a notch of the gas generator support.

* * * * *